United States Patent
Andersen et al.

[11] Patent Number: 5,969,371
[45] Date of Patent: Oct. 19, 1999

[54] METHOD AND APPARATUS FOR FINDING MEDIA TOP-OF-PAGE IN AN OPTICAL IMAGE SCANNER

[75] Inventors: Eric L. Andersen, Meridian; Darrell L. Cox; Rhasool Shabazz, both of Boise, all of Id.

[73] Assignee: Hewlett-Packard Company, Palo Alto, Calif.

[21] Appl. No.: 08/879,999

[22] Filed: Jun. 20, 1997

Related U.S. Application Data

[63] Continuation-in-part of application No. 08/705,494, Aug. 29, 1996, abandoned.

[51] Int. Cl.[6] .................................................. G01N 21/86
[52] U.S. Cl. .............................. 250/559.15; 250/559.36
[58] Field of Search ........................... 250/559.36, 223 R, 250/559.24, 559.25, 559.12, 559.15; 356/384, 385, 386

[56] References Cited

U.S. PATENT DOCUMENTS

| | | | |
|---|---|---|---|
| 4,286,149 | 8/1981 | Ben-Nathan et al. | 250/223 R |
| 4,417,148 | 11/1983 | Otake | 250/559.36 |
| 4,691,100 | 9/1987 | Kizu et al. | 250/223 R |
| 4,782,238 | 11/1988 | Radl et al. | 250/559.36 |
| 5,115,142 | 5/1992 | Taguchi et al. | 250/559.36 |
| 5,280,171 | 1/1994 | Halter | 250/223 R |
| 5,659,396 | 8/1997 | Mondie | 250/559.36 |

*Primary Examiner*—John R. Lee
*Attorney, Agent, or Firm*—Lane R. Simmons

[57] ABSTRACT

A system and method for sensing a leading edge of a document in an imaging scanner includes detecting a shadow adjacent the leading edge, the shadow being cast as a result of the edge being exposed to a light source. Light is reflected off of a white drive roller support surface for the document and is sensed by a photo sensor array. As the document is processed through the scanner, the leading edge is exposed to the light such that the leading edge casts a shadow onto the drive roller. The shadow is sensed by the photo sensor array which sends a signal to a microprocessor for computing whether a threshold amount of shadow has been detected for initiating image scanning of the document. Prior to the medium being exposed to the light, a contrast sensitivity level of the photo sensor array is increased, relative to a normal level, for detecting the shadow. Upon detecting the threshold amount of shadow, the contrast sensitivity level is returned to its normal level for continuing with normal image processing of the document.

28 Claims, 6 Drawing Sheets

METHOD AND APPARATUS FOR FINDING MEDIA TOP-OF-PAGE IN AN OPTICAL IMAGE SCANNER

CROSS REFERENCE TO RELATED APPLICATION(S)

This is a continuation-in-part of application Ser. No. 08/705,494 filed on Aug. 29, 1996, now abandoned.

FIELD OF THE INVENTION

This invention relates in general to optical image scanning and, more particularly, to sensing media top-of-page in an optical image scanning apparatus having a contact image sensor and an automatic document feeder.

BACKGROUND OF THE INVENTION

Optical scanners operate by imaging an object (from a sheet of paper, document or other form of medium) with a light source, sensing a resultant light signal with an optical sensor array, and each optical sensor in the array generating a data signal representative of the intensity of light impinged thereon for that portion of the imaged object. The data signals from the array sensors are then processed (typically digitized) and stored on a suitable medium such as a hard disk of a computer for subsequent display and/or manipulation. The image of the scanned object is projected onto the optical photo sensor array incrementally by use of a moving scan line. The moving scan line is produced either by moving the document with respect to the scanner optical assembly, or by moving the scanner optical assembly relative to the document. Either of these methods may be embodied in flat bed scanners, hand held scanners, or any scanner having automatic document feed capabilities.

Various types of photo sensor devices may be used in optical scanners. For example, a commonly used photo sensor device is the charge coupled photo sensor device (CCD). A CCD builds up an electrical charge in response to exposure to light. The size of the electrical charge built up is dependent on the intensity and the duration of the light exposure. In optical scanners, CCD cells are aligned in linear arrays. Each cell or "pixel" has a portion of a scan line image impinged thereon as the scan line sweeps across the scanned object. The charge built up in each of the pixels is measured and discharged at regular "sampling intervals." In most modern optical scanners, the sampling intervals of the CCD arrays are fixed.

As previously mentioned, an image of a scan line portion of a document is projected onto the scanner's linear sensor array by scanner optics. In CCD scanners, the scanner optics comprise an imaging lens which typically reduces the size of the projected image from the original size of the document considerably. Pixels in a scanner linear photo sensor array are aligned in a "cross" direction, i.e., a direction parallel to the longitudinal axis of the scan line image which is projected thereon. The direction perpendicular to the "cross" direction will be referred to herein as the "scan" direction (i.e., paper or scanner movement direction for scanning of the image).

At any instant when an object is being scanned, each pixel in the sensor array has a corresponding area on the object which is being imaged thereon. This corresponding area on the scanned object is referred to herein as an "object pixel" or simply "pixel." An area on a scanned object corresponding in area to the entire area of the linear sensor array is referred to herein as an "object scan line" or simply "scan line." For descriptive purposes a scanned object is considered to have a series of fixed adjacently positioned scan lines. Further, scanners are typically operated at a scan line sweep rate such that one scan line width is traversed during each sampling interval.

Differentiating from scanners employing CCDs, a contact image sensor (CIS) and CIS drive roller are commonly employed in document fed scanners for imaging the medium being passed (fed) through the scanner. The CIS is spring loaded against the drive roller and forms a nip therebetween. The medium being scanned is presented for scanning at the nip and is pulled passed the CIS by the drive roller. The CIS typically comprises a glass plate adjacent the roller (forming the nip), an array of light sources such as light emitting diodes (LED's) directed at the nip, an array of self-focusing lenses (cylindrical microlenses) that direct and focus the light from the light sources as reflected off the medium (or roller if no medium is present), and an array of photo sensors adjacent the self-focusing lenses for converting the light passed through the lenses to electrical signals for processing of the image generated. An advantage of the CIS is that it is less susceptible to having foreign particles (i.e., dust) settle on the CIS optics which could degrade the scanned image quality. A CIS is less susceptible to foreign particles because it has fewer reflecting optics, relative to CCD scanner devices, for focusing the light. Another advantage of the CIS is its small size due to its optical configuration.

Certain document fed scanners employ an automatic document feeder (ADF) for automatically feeding the document (medium) through the scanner. ADFs typically employ sensors or multiple sensors for detecting a leading edge of the document as it is automatically grabbed and fed into the scanner by a "pick"-roller (or "D"-roller). From the point in time that the sensors detect the leading edge, the number of steps (or amount of time) needed to transfer the leading edge to the imaging assembly, such as a contact image sensor (CIS), are monitored so that the imaging assembly may initiate actual imaging at the precise time when the leading edge of the medium reaches the CIS.

Certain drawbacks exist with this conventional approach. For example, with mechanical sensors, most printers can "repeat" only from about ⅛ to ¼ inch top-of-page—meaning, even with the system working properly, actual initiation of image scanning relative to the actual top-of-page may vary ⅛ to ¼ inch from page to page. This is due to factors such as media type, temperature and humidity. Furthermore, scanners are generally configured to scan various types and sizes of documents having differing weights and composed of differing materials (for example, sheet paper, photographs, transparencies, etc). As such, "slip" may occur between the document and the pick-roller as the document is grabbed and transferred to the imaging assembly. Once the document reaches the imaging assembly, it is passed through the nip formed between the imaging assembly and the drive roller. Prior to reaching the nip (and thereby being pulled by the drive roller), the amount of slip may be highly variable, depending upon several factors related to the document being handled, such as stiffness, surface finish, cross sectional area, etc. (with these also being a function of temperature and humidity). CCD scanners don't typically have as much slip problem as CIS scanners because there is no pressure formed at the imaging location of the CCD scanner optics assembly (i.e., there is no driver roller forming a nip). In contrast, there is pressure at the nip of a conventional CIS optics assembly because of the pressured drive roller forming the nip with the CIS assembly.

Since the amount of slip can vary in CIS scanners, and since actual imaging is, conventionally, only initiated at the imaging assembly based upon the number of steps counted (or amount of time detected) from the time the leading edge passes the sensors, there can be a highly variable difference in the top of the image scanned (relative to the document top-of-page). For example, it has been shown that about a one inch slip difference can occur between a photograph and a piece of sixteen (16) pound paper. This, of course, variably offsets the top of the image scanned for each document.

In certain prior art auto-feed imaging systems it has been known to increase the pick-roller force to reduce slip of the document. However, this method tends to increase "buckle" problems for the document in the transfer path (because of the nip pressure), and also severely limits the range of types of media that can be used by the imaging system (i.e, thicker documents have more trouble at the pick roller).

In systems that do not use ADF devices, "slip" does not occur because there is no pick-roller and the operator manually pushes the document into the system (to the nip between the CIS and drive roller).

In other prior art CIS systems it has also been known to use black driver rollers so that white (or lighter colored) media can easily be detected for initiating actual imaging of the document. However, this limits the type and color of media that can be used and/or detected well in the system. Specifically, a true edge of the document being imaged cannot always be detected because a change from black is what is being sensed. As such, if a black border document is scanned, the document's true edge will not be detected.

Another problem with the black roller is that in certain imaging systems, the image scanned can be sent directly to a printer device from the scanner for immediate printing (as a "convenience copy") without going through a host computing device for data manipulation options. In the event a black roller is used and a "convenience copy" is selected for imaging something smaller than the full document size, then a black border will surround the scanned image. For example, if a small business card is scanned, most of the page of the convenience copy will be black border surrounding the imaged business card. This is especially undesirable because of the excessive and wasteful use of toner in the printer device as a result of producing the black border.

Yet another problem associated with scanners that provide a convenience copy is if the actual edge of the medium is not properly detected so that page/image dimensions are accurately determined, then the convenience copy may very well end up being "two" copies because a one page original is "seen" (scanned) as extending beyond a single page. Thus, two pages are printed, each with part of the original image scanned thereon. This problem is also compounded given that laser printers, for example, reserver a border area around the page as a non printable area. As such, if the actual top-of-page is not detected, and scanning initiates late, the first scanned area will be deemed the "border" area and "thrown out" during a convenience copy process.

Given the forgoing problems and limitations of prior art image scanning methods and apparatus, objects of the present invention are to provide an improved means and method for accurately sensing a top-of-page for improved imaging in a scanner, and especially in a scanner having automatic document feed capabilities in connection with CIS optics.

SUMMARY OF THE INVENTION

According to principles of the present invention in a preferred embodiment, a system and method for sensing a leading edge of a document in an imaging scanner includes detecting a shadow adjacent the leading edge, the shadow being cast as a result of the edge being exposed to a light source. Light is reflected off of a white drive roller support surface for the document and sensed by a photo sensor array. As the document is processed through the scanner, the leading edge is exposed to the light such that the leading edge casts a shadow onto the drive roller. The shadow is sensed by the photo sensor array which sends a signal to a microprocessor for computing whether a threshold amount of shadow has been detected for initiating image scanning of the document. An area average (or running average) of light sensed is used in detecting the threshold amount.

According to further principles of the present invention, prior to the medium being exposed to the light, a contrast sensitivity level of the photo sensor array is increased, relative to a normal level, for detecting the shadow. Upon detecting the threshold amount of shadow, the contrast sensitivity level is returned to its normal level for continuing with normal image processing of the document.

The present invention provides an improved system and method for detecting a leading edge of a document in an imaging scanner for precisely and accurately initiating imaging of the document, especially in the context of a contact image sensor scanner having automatic document feeder capability.

Other objects, advantages, and capabilities of the present invention will become more apparent as the description proceeds.

DETAILED DESCRIPTION OF THE INVENTION

Figure 1:
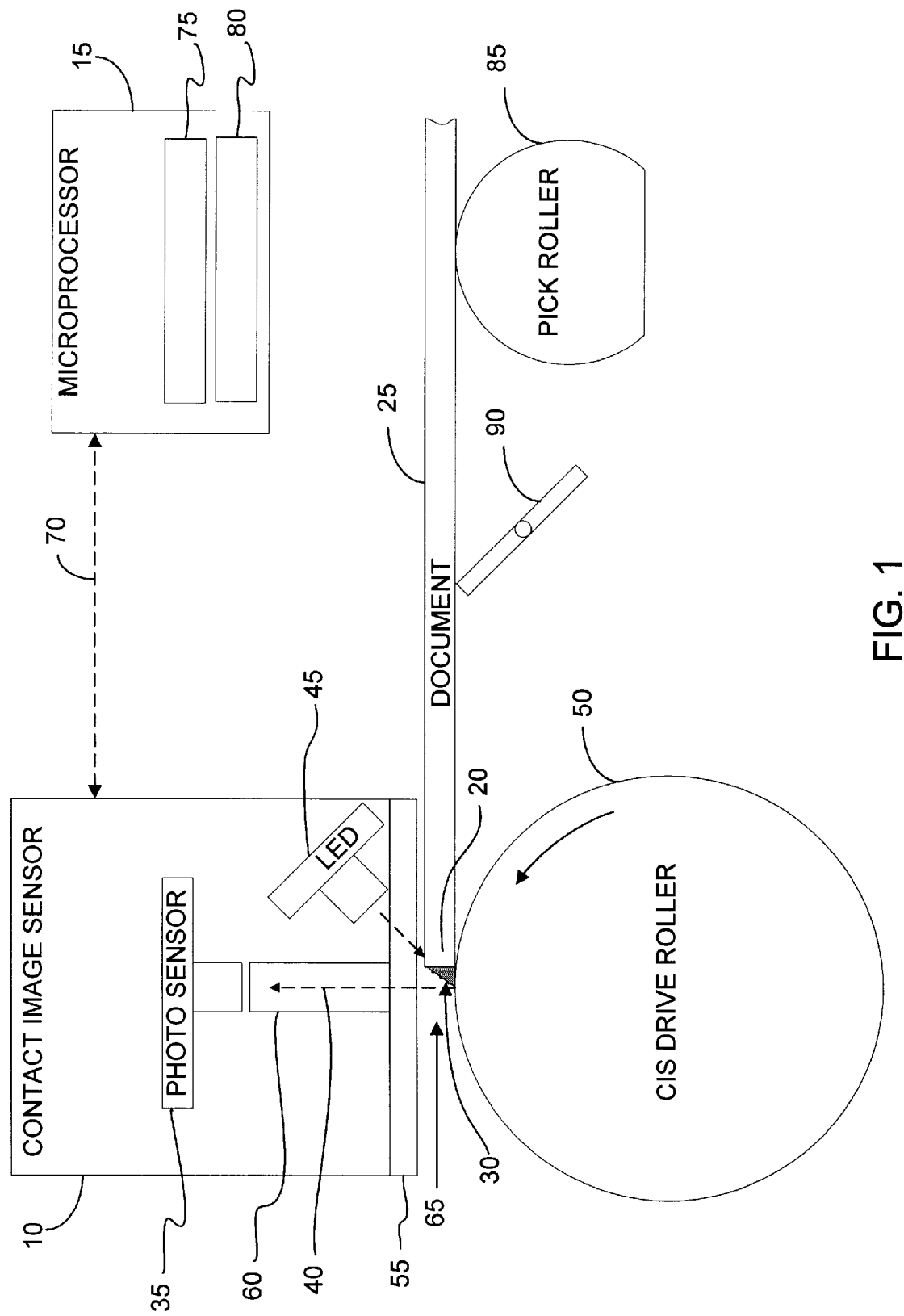
FIG. 1 is a block diagram of an imaging scanner including an imaging assembly and microprocessor, wherein principles of the present invention are embodied for detecting a leading edge of a document being imaged by detecting a shadow cast adjacent to the edge.

FIG. 1 is a block diagram of an imaging scanner including a contact image sensor (CIS) 10 and microprocessor (processor) 15, wherein principles of the present invention are embodied for detecting leading edge 20 of document 25 being imaged by detecting shadow 30 cast adjacent to edge 20. For ease of discussion purposes, the word "document" is used herein to mean any form of media that can be imaged by the imaging scanner, such as sheet paper, photographs, transparencies, etc.

CIS 10 includes a photo sensor device 35, such as a photo diode, for sensing light 40. The light 40 is produced by light source 45 and is reflected off of CIS drive roller 50 up through glass plate 55 and self-focusing lens 60 to photo sensor 35. Light source 45 is any conventional light source such as a light emitting diode (LED). CIS 10 and drive roller 50 are pressure supported adjacent each other to form nip 65 for receiving document 25 such that drive roller 50 is able to pull document 25 through the nip for imaging by CIS 10. Although not shown, a plurality of photo sensors 35, self-focusing lens 60, and light sources 45 are actually provided sufficient to form a linear array scan line for scanning a defined area, as conventional in the art for an imaging scanner. In such a configuration, there are multiple photo sensors 35 (i.e., a photo sensor array) for each self-focusing lens 60, and there are multiple self-focusing lens 60 for each light source 45. However, only one of each of these components is shown for ease of discussion and clarity of depiction for the present invention.

The electrical charge built up in photo sensor 35 in response to the exposure to light 40 is discharged to processor 15 as a signal through communications link 70. Processor 15 includes storage means as conventional in the art, such as registers 75 and 80. The signal sent by photo sensor 35 is stored in such storage means (or other storage means) as necessary for processing by processor 15. Processor 15 executes firmware or other code as necessary for implementing the present invention in connection with any other conventional scanner operations.

Pick-roller 85, as part of an automatic document feeder (ADF) for the overall scanner system, grabs document 25 from an input tray (not shown) for automatically transferring the document through the transfer path of the scanner. As discussed, it is especially with ADF systems that "slip" may occur with the document as it is transferred by pick-roller 85 to nip 65. In the event of slip occurring, the present invention is still accurate in detecting the leading edge of document 25 because it detects shadow 30 adjacent the edge and, consequently, initiates actual image scanning upon detecting the shadow.

In contrast, and as previously discussed, prior art systems using ADFs typically rely on mechanical (or slot interrupt optical) sensors, such as paper sensor 90, located somewhere in the paper (transfer) path between pick-roller 85 and nip 65. These prior art sensors would sense leading edge 20 and then the system would rely on counting or timing the number of steps, i.e., motor steps, required for transferring the document from the sensors to the CIS for determining when to initiate actual image scanning at the CIS. As mentioned, these prior art systems and methods are susceptible to variable amounts of slip in the document transfer and, thus, variable amounts of inaccuracy in beginning scanning of the actual leading edge (or top-of-page) of the document being scanned.

Paper sensor 90 checks for the existence of paper in the transfer path of the system. Although it is not used as the primary device for detecting leading edge 20 in the present invention for initiating actual CIS scanning, it is used for initiating counting of steps or timing of the transfer of the document (as conventional in the art) to CIS 10 or other system components (not shown).

In a preferred embodiment, CIS drive roller 50 is of a white color rather than a black or dark color. The white color provides for improved sensing of shadow 30 of leading edge 20 as the shadow is cast on the roller in response to document 25 being exposed to light source 45. The white color also provides good imaging results in the event a "convenience copy" is selected, i.e., a black border will not result around the imaged object.

Although CIS drive roller 50 is preferred, if principles of the present invention are implemented in another type of scanner, such as a hand held scanner, it is conceivable that the support surface would not be a drive roller but would be some other surface. Such a surface would also provide best operational results for the invention, as discussed, if the surface is of a white or light color.

Figure 2:
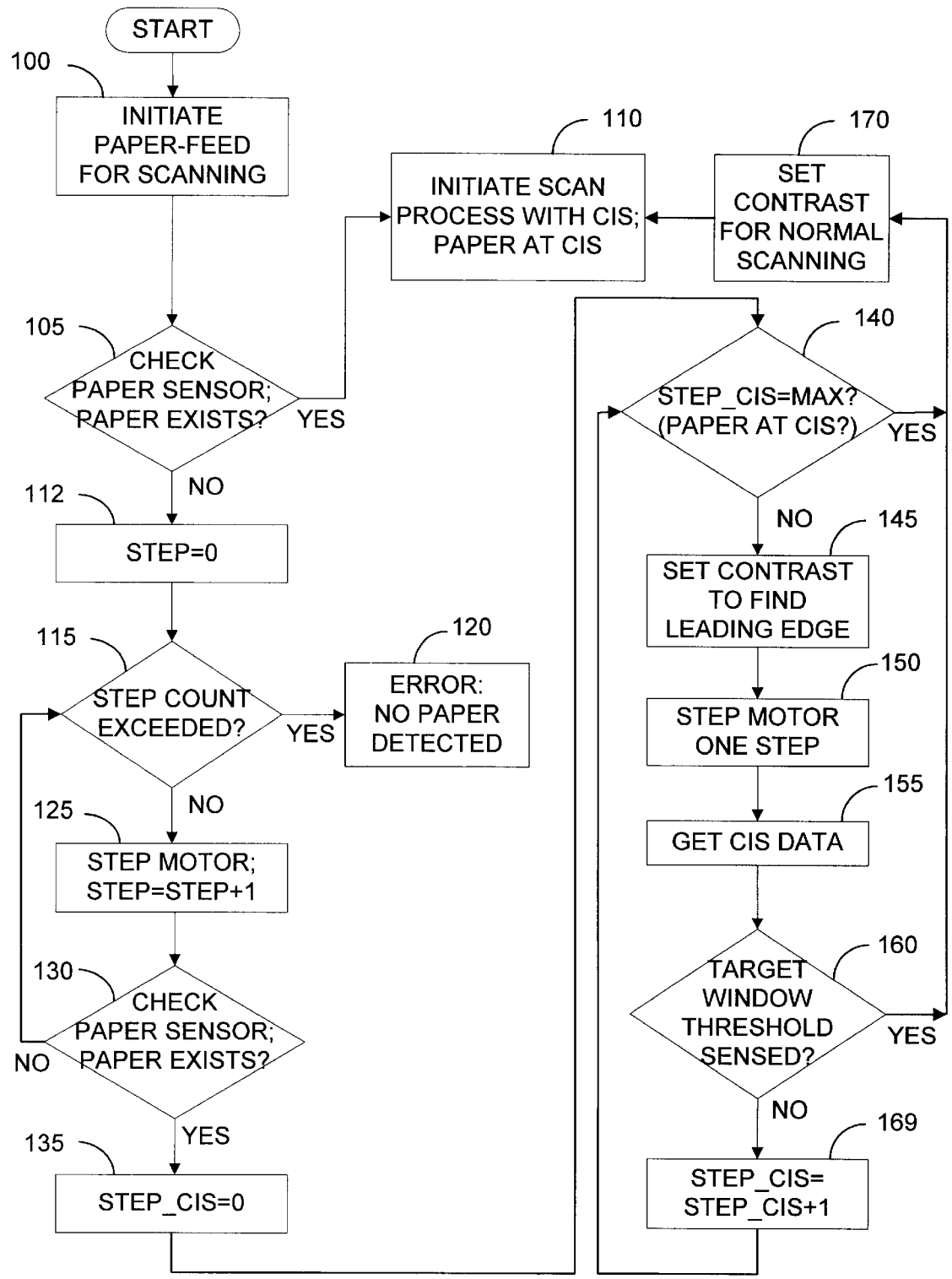
FIG. 2 is a flow diagram depicting a method of the present invention.

Referring now to FIG. 2, a flow diagram depicts a preferred method of the present invention as implemented in connection with the scanner/imaging system of FIG. 1. First, the general process for starting a paper (document) feed for scanning an image is initiated 100. Various conventional means may accomplish this step, such as a user pushing a start button on the scanner, or a host computer transmitting an appropriate signal to the scanner. Next, 105, the paper sensor 90 is checked to determine whether a document has entered the system without using the ADF. For example, if a user forces a document into the system without using the ADF, such as by circumventing the pick-roller and manually inserting the document into the system, then the paper sensor would detect that a document already exists in the system, ready for scanning. If so, the actual CIS scan process is immediately initiated 110 because the document is sensed to be ready and waiting, probably at nip 65, for scanning purposes.

In the event no document is sensed, 105, a counter is initiated 112 for counting the predetermined number of steps necessary for getting the document from pick-roller 85 to paper sensor 90. The number of steps to be counted for any particular system depends on the specific design criteria of the system, such as step motor parameters and distance between pick-roller 85 and paper sensor 90. This count may be used, for example, to detect a paper tray empty status or inadvertent or inappropriate initiation of processing. If it is detected that the maximum number of steps has been exceeded 115, then the system initiates error processing 120 to indicate that no document has been detected. Any conventional error processing may occur, such as displaying a message, or resetting or halting operations appropriately, as determined by arbitrary design choice.

If the predetermined number of steps are not exceeded 115, then the step motor (not shown) steps one step and the counter increments the step count 125. The paper sensor is checked again 130 and, if no document exists, another check is made 115 to determine if the predetermined number of steps have been exceeded and the process may be repeated as shown.

On the other hand, if the document exists 130 (i.e., sensed at paper sensor 90), then another counter (Step_CIS) is initiated 135 for counting the number of steps necessary for getting the document from paper sensor 90 to nip 65 of CIS 10 and drive roller 50. Again, the maximum number of steps to be counted from this check point depends on the specific design criteria of the system and the distance between paper sensor 90 and nip 65. A check is then made 140 to determine if the Step_CIS counter has reached its predetermined maximum number of steps (meaning the document should be at the nip). In the event it has, the contrast sensitivity level of photo sensor array 35 is set for normal scanning 170 and the actual CIS scan process is immediately initiated 110 because the document is sensed to be ready and waiting at nip 65 of CIS 10 for scanning purposes. This counting of the steps provides a backup check for determining that CIS scanning should be initiated in the event shadow 30 is not detected (as discussed further on in the flow diagram).

If Step_CIS has not reached its predetermined maximum number of steps, then the contrast sensitivity level for photo sensor array 35 is increased 145 relative to a normal image processing sensitivity level. The increased level will help sense shadow 30 of leading edge 20, especially in the case where an extremely thin, white or transparent document is being processed. Next, the step motor steps one step 150, CIS 10 (photo sensor array 35) detects an amount of light reflected from drive roller 50, and then that photo sensor array data is retrieved 155 for processing by microprocessor 15.

If processor 15 detects that the array data satisfies a predefined target window impingement threshold 160, then the contrast level is set (or reset) to the normal scanning sensitivity level 170 and the CIS scan process for actually imaging the document is immediately initiated 110 because shadow 30 is sensed to be at nip 65. The target window impingement threshold is a predefined value of light impingement upon a predefined number of pixels in a predefined "window" area of photo sensor array 35. Preferably, only a relatively small target "window" over the entire photo sensor array is monitored for fast and simplified processing, and to better manage edge detection in the event of the medium being skewed at the nip. Thus, for example, when the target window is detected as being all black (relative to an impingement threshold value for black), then that is considered to be indicative of a shadow or edge of the document.

Although preferably the target window is small relative to the entire sensor array, it must not be too small. If it is too small, then the likelihood increases of incorrectly sensing foreign particles (i.e., dust) as being the edge shadow. An actual target window size is best determined by design criteria and processing parameters of each particular scanner system. Similarly, the location of the target window within the scan line is best determined by design criteria and processing parameters. For example, if the ADF is center fed operated, the window may work best by only covering a predefined center area of the document transfer path. As such, only that center area of the array is checked for shadow detection. On the other hand, the window could be the entire photo sensor array, but increased processing is required to determine whether the shadow has been detected.

Figure 3:
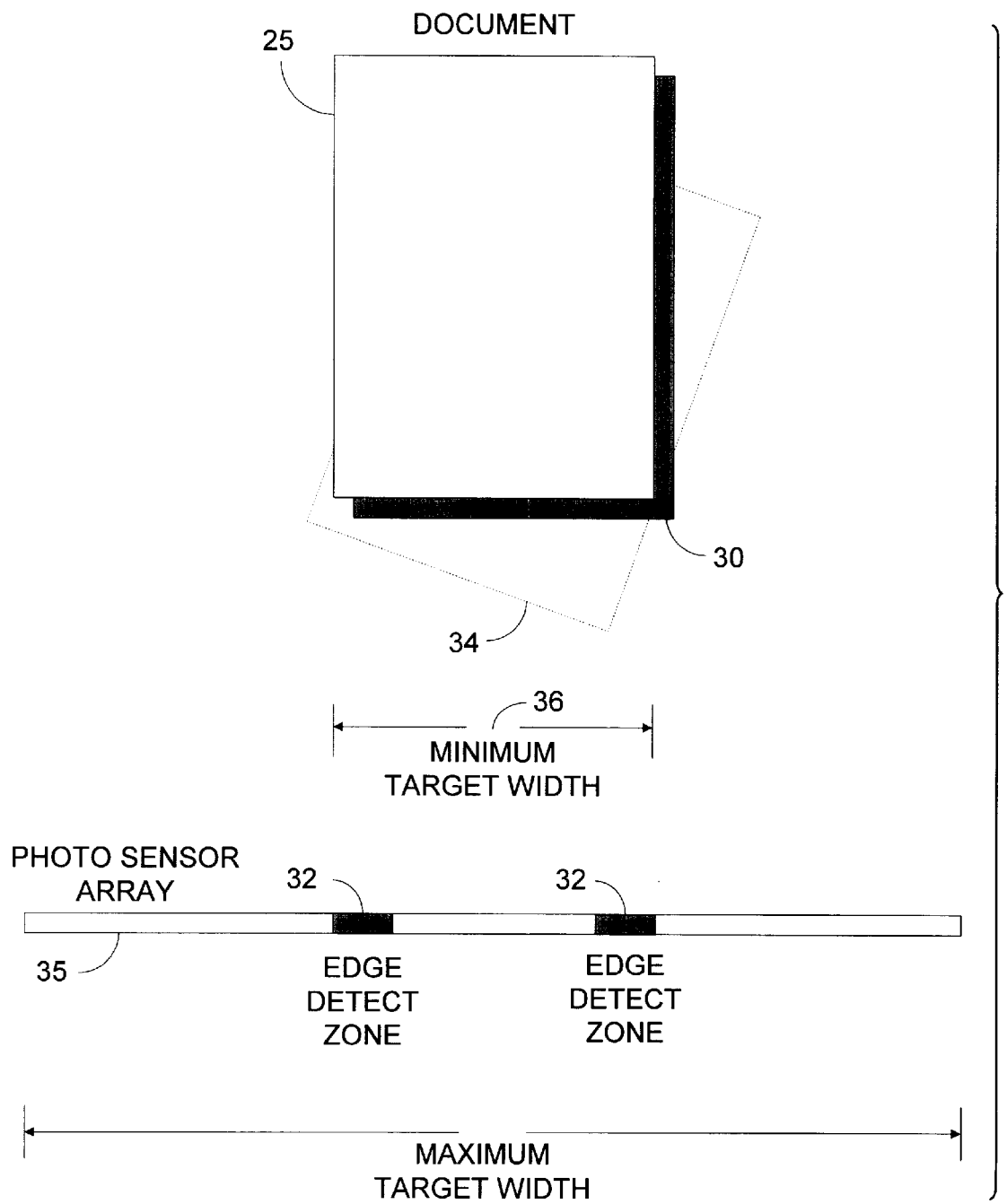
FIG. 3 is a block diagram of preferred edge detect zones in a photo sensor array for detecting a shadow of a document.

Referring now to FIG. 3, in a preferred embodiment the target "window" comprises two edge detect zones 32 in photo sensor array (scanline) 35. Each edge detect zone 32 is fairly small, i.e., about 10–20% of a minimum supported document width 36. This dual zone configuration provides a means for detecting edge shadow 30 of document 25 that may be skewed 34 because one side of the skewed document will pass through one of the corresponding zones. In a worst case skew condition, the leading edge of the document would be less horizontal and more vertical (relative to photo sensor array 35), meaning that the horizontal shadow width could approach one to zero pixels in width. Thus, preferably, target edge detect zones 32 are fairly small in order to detect the document edge in the event of such worst case skew.

Since white CIS roller 50 (FIG. 1) is susceptible to dirt and/or ink stain contaminations, such contaminations can cause a "false" shadow image and thus a false edge detection. Accordingly, a preferred embodiment of the present invention utilizes an area averaging scheme with respect to the target window (edge detect zones 32) for edge/shadow detection. An area average (or running average) is an average of some set number of "line sums". A "line sum" is a summation of all of the pixel values in both edge detect zones 32 for each motor step or scanline (150, FIG. 2). This summing of both zones prior to further calculations reduces subsequent overall data storage and management requirements by eliminating the need for storing two separate zone light impingement values and by eliminating the need to process them separately for subsequent area averaging.

An area average (running average) indicates what the trend of line sums is over a set number of motor steps (scanlines). This set number of scanlines can be thought of as an area because it describes a width (single line sum) and length (motor steps). If, for example, the set number of motor steps is 10, then the 10 most recent line sums are averaged to produce the area average. Upon retrieval of a next line sum (i.e., upon a next motor step), the oldest line sum is removed from the area average, the next line sum is included, and a new area average is computed. This "bubble-up" (or first in first out—FIFO) process keeps the area average at a constant number of motor steps and supplies only recent data in the computations.

To determine whether a shadow 30 (or document 25 edge) has been detected, each time a new/next line sum is retrieved, the difference between the new line sum and the area average is computed to produce a delta value. This delta value is then compared to the target window impingement threshold value. The threshold value is the minimum acceptable difference between the area average and the new line sum. When the delta is greater than the threshold, a "white-roller-to-black-image" transition has taken place (or in other words, the determination is made that such a transition has taken place). This transition indicates that the shadow 30 of the edge of the document 25 has been detected. Accordingly, scan processing is then initiated.

Figure 4:
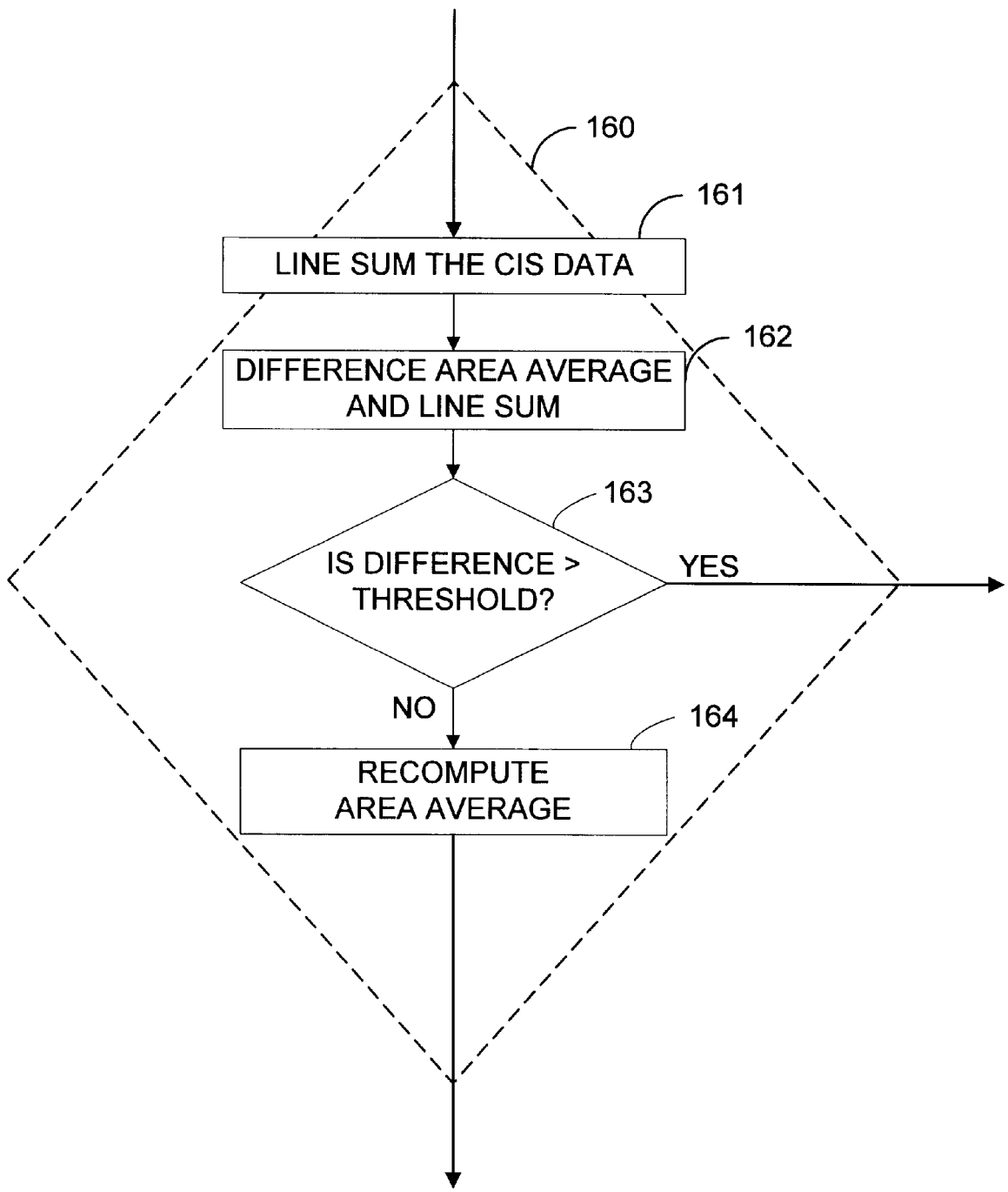
FIG. 4 is a flow chart depicting further detailed steps of the invention for determining whether a threshold amount of light is sensed.

Referring now to FIG. 4, a flow chart further details the preferred method just described for determining whether a threshold amount of light has been sensed. Specifically, FIG. 4 details decision diamond 160 of FIG. 2. As shown, the CIS data is first summed 161 to obtain the line sum value for the current scan line. Next, the difference between the area average and the line sum is calculated 162. Then, 163, if the difference is greater than the impingement threshold value, control transfers to steps 170 (FIG. 2) to set the contrast for normal scanning and to subsequently initiate scanning 110. On the other hand, if the difference does not exceed the threshold, an edge has not been detected so the area average is recomputed 164 to include the most recent line sum calculated.

Figure 5:
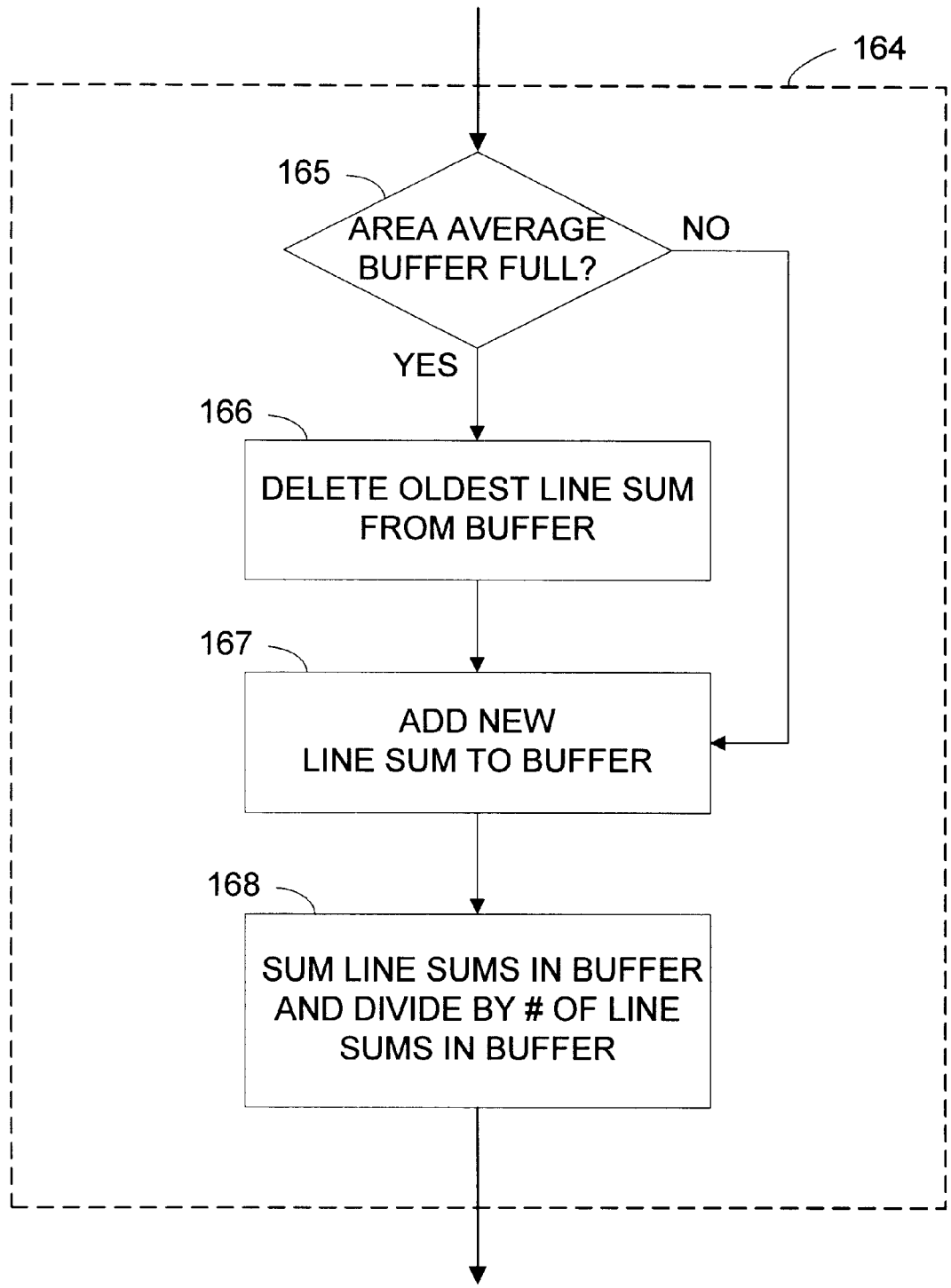
FIG. 5 is a flow chart depicting further detailed steps of the invention for computing an area average amount of light sensed.

The area average is recomputed 164 as shown in reference to the further flow detail of FIG. 5. If the area average buffer is full 165 (for example, if all of the buffer locations are filled), then the oldest line sum is deleted 166 from the buffer and the new line sum is added to the buffer 167. On the other hand, if the buffer is not full, step 166 of deleting the oldest buffer is skipped. Once the buffer is modified appropriately, the line sums in the buffer are all summed together 168 and then that total is divided by the number of line sums that exist in the buffer. This produces and keeps the current running area average.

Figure 6:
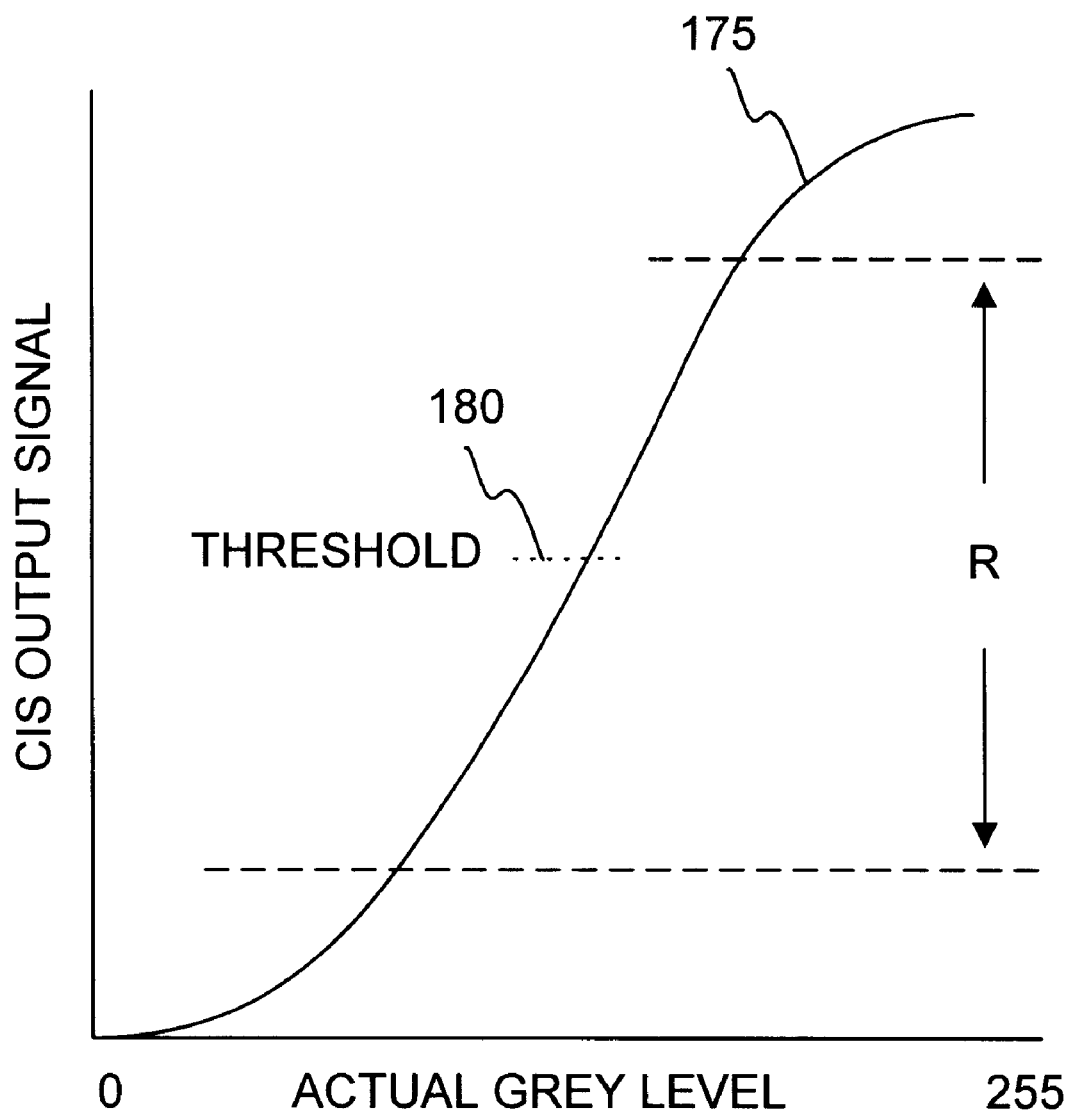
FIG. 6 is a graph representative of a gamma table for determining a threshold amount of light impingement upon a contact image sensor as a shadow is detected.

In a preferred embodiment, the target window impingement threshold value is set by referencing a gamma table as represented by the graph in FIG. 6. Graphed line 175 represents a CIS output signal, indicative of light impingement upon the CIS as a shadow is detected. The lower left corner of the graph, denoted with the number zero, represents when no shadow is detected and a full amount of light is reflected off a drive roller support surface, thus no CIS output. As shadow is scanned, the amount of darkness detected is represented by 255 levels of grey (in this example). Accordingly, the darker the shadow detected (i.e., the closer the shadow is to the edge of the media), the more the grey level approaches 255 and the greater the output signal 175 of the CIS. A predefined range "R" is a preferred range for setting the target window impingement threshold value 180. Range "R" is typically defined within about 10% of the grey level upper and lower extremes, but may vary depending upon design criteria and manufacturing capabilities of the CIS. Threshold value 180 is best determined by design criteria also. If it is set too low, then what is being detected may actually be foreign particles rather than the document edge shadow. If it is set too high, the shadow may be missed and what may be detected is the actual surface of (or image on) the medium rather than the shadow.

Returning now to the flow of FIG. 2, if the predefined target window impingement threshold is not satisfied 160, then the step counter (Step_CIS) is incremented 169 and processing control is returned to check whether the Step_CIS counter has reached its predetermined maximum number of steps 140. Again, this check loop processing provides a backup means for determining whether CIS scanning should be initiated in the event shadow 30 is not detected.

Finally, what has been described above are the preferred embodiments for a system and method for detecting a leading edge of a document in an image scanner device by detecting a shadow adjacent the leading edge. Although the disclosure has been focused on detecting the leading edge of a document for image scanning, it will be obvious that any edge could just as easily be detected for whatever document processing criteria may be required. Further, it will be obvious to one of ordinary skill in the art that the present invention is easily implemented utilizing any of a variety of hardware platforms and software tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A method for sensing an edge of a medium in a medium processing device, the medium processing device including a light source and a photo sensor array, the method comprising detecting a shadow adjacent the edge of the medium, the shadow being cast as a result of the edge being exposed to the light source, and wherein detecting the shadow includes:

(a) prior to the medium being exposed to the light source, increasing a contrast sensitivity level of the photo sensor array relative to a normal image processing sensitivity level;

(b) detecting a threshold amount of light sensed by the photo sensor array, the threshold being indicative of at least a portion of the shadow being sensed; and, (c) upon sensing the threshold, returning the contrast sensitivity level to the normal image processing sensitivity level for continuing with normal image processing of the medium.

2. The method of claim 1 wherein the medium processing device is an imaging scanner.

3. The method of claim 1 wherein the edge is a leading edge of the medium relative to a processing direction for the medium in the medium processing device.

4. The method of claim 1 wherein the light source is directed onto a support surface used for supporting the medium in association with using the medium processing device, and wherein the shadow is cast onto the support surface as the medium is exposed to the light source.

5. The method of claim 4 wherein the photo sensor array senses light from the light source as reflected from the support surface, and wherein the shadow is detected by the photo sensor array upon sensing a threshold amount of light being reflected from the support surface.

6. The method of claim 4 wherein the support surface is of a white color.

7. The method of claim 1 wherein the photo sensor array and the light source are associated with a contact image sensor assembly in connection with the medium processing device, and wherein a surface of the contact image sensor assembly is supported adjacent a drive roller such that a nip is formed therebetween, the method further including directing the light source onto the drive roller such that the shadow is cast onto the drive roller as the medium is exposed to the light source at the nip, and wherein the shadow is sensed by the photo sensor array.

8. A computer-readable medium having computer-executable instructions for performing steps for sensing an edge of a medium in a medium processing device, including detecting a shadow adjacent the edge of the medium, the shadow being cast as a result of the edge being exposed to a light source, and wherein the shadow is detected by at least one predefined window of photo sensors in a photo sensor array.

9. A method for sensing an edge of a medium in an image transfer device, the method comprising:

(a) radiating a light source upon a surface of a processing path for the medium in the image transfer device;

(b) increasing a contrast sensitivity level of a photo sensor array relative to a normal image processing sensitivity level;

(c) detecting an amount of light reflected from the surface of the processing path;

(d) comparing the amount of light detected with a threshold amount of light to produce a compare result, the threshold amount of light being indicative of a shadow being cast over at least a portion of the processing path in response to the edge of the medium being exposed to the light source in the processing path; and, (e) in the event the compare result is not less than the threshold level, then returning the contrast sensitivity level to a normal image processing sensitivity level and initiating an image transfer of the medium, otherwise, in the event the compare result is less than the threshold level, then repeating steps (a) through (e) until the threshold level is reached.

10. The method of claim 9 wherein the image transfer device is an imaging scanner.

11. The method of claim 9 wherein the edge is a leading edge of the medium relative to a processing direction for the medium in association with the image transfer device.

12. The method of claim 9 wherein the surface of the processing path is a drive roller, and wherein the light source and photo sensor array are associated with a contact image sensor assembly in connection with the image transfer device, and wherein a surface of the contact image sensor assembly is supported adjacent the drive roller such that a nip is formed therebetween, the method further including directing the light source onto the drive roller such that the shadow is cast onto the drive roller as the medium is exposed to the light source at the nip, and wherein the shadow is sensed by the photo sensor array.

13. A medium processing device, comprising:

(a) a support surface for supporting a medium to be processed in the medium processing device;

(b) a light source directed upon the support surface;

(c) a photo sensor array for sensing a shadow cast upon the support surface as a result of an edge of the medium being exposed to the light source; and, (d) processing means for processing signals produced by the photo sensor array such that the signals are processed and recognized as being indicative of the edge of the medium casting the shadow upon the support surface, and wherein the processing means includes:
  (i) memory apparatus for storing a plurality of line sum indicia, each line sum indicia being indicative of an amount of light reflected from the support surface as sensed by one or more zones of photo sensors of the photo sensor array for a given scanline;
  (ii) computational apparatus for computing a running average from the plurality of stored line sum indicia;
  (iii) differencing apparatus for differencing the running average with a most recent line sum indicia to produce a resultant value; and,
  (iv) compare apparatus for comparing the resultant value with a threshold value, the threshold value being indicative of the shadow being cast upon the support surface.

14. A system for detecting an edge of a medium in a medium processing device, the system comprising:
  (a) a support surface for supporting the medium;
  (b) a light source directed upon the support surface;
  (c) an array of photo sensors; and,
  (d) control apparatus for controlling the array of photo sensors such that at least one predefined window of the array of photo sensors senses a shadow cast upon the support surface as a result of the edge of the medium being exposed to the light source.

15. The system of claim 14 wherein the edge of the medium is a leading edge relative to a processing direction of the medium in the medium processing device.

16. The system of claim 14 wherein the support surface is a drive roller and the array of photo sensors are disposed adjacent the drive roller, and wherein the control apparatus includes executable code.

17. The system of claim 14 further including processing means for processing signals produced by the array of photo sensors such that the signals are processed and recognized as being indicative of the edge of the medium casting the shadow upon the support surface.

18. The system of claim 17 wherein the processing means includes:
  (a) means for storing first indicia being indicative of an amount of light reflected from the support surface;
  (b) means for comparing the first indicia with a threshold level indicia to produce a compare result, the threshold level indicia being indicative of at least a portion of the shadow being cast upon the support surface as a result of the edge of the medium being exposed to the light source; and,
  (c) means for producing a control signal for controlling the medium processing device in response to the compare result in the event the compare result is not less than the threshold level.

19. The system of claim 18 wherein the medium processing device is an image scanner, and wherein the control signal initiates actual image scanning of the medium in the medium processing device.

20. The system of claim 17 wherein the processing means includes:
  (a) memory apparatus for storing a plurality of line sum indicia, each line sum indicia being indicative of an amount of light reflected from the support surface as sensed by one or more given zones of photo sensors of the photo sensor array for a given scanline;
  (b) computational apparatus for computing a running average from the plurality of stored line sum indicia;
  (c) differencing apparatus for differencing the running average with a most recent line sum indicia to produce a resultant value; and,
  (d) compare apparatus for comparing the resultant value with a threshold value, the threshold value being indicative of the shadow being cast upon the support surface.

21. The system of claim 14 wherein the support surface is of a white color.

22. A method for sensing an edge of a medium in a medium processing device, the method comprising detecting a shadow adjacent the edge of the medium, the shadow being cast as a result of the edge being exposed to a light source, and wherein the shadow is detected by at least one predefined window of photo sensors in a photo sensor array.

23. The method of claim 22 wherein the at least one predefined window is of a dimension of about 10–20% of a minimum supported width of the medium.

24. The method of claim 22 wherein the at least one predefined window of photo sensors includes two separate zones of the photo sensors.

25. The method of claim 24 wherein each zone is of a dimension of about 10–20% of a minimum supported width of the medium.

26. The method of claim 22 further including:
  (a) summing light impingement values associated with the at least one predefined window of photo sensors for a next scanline for producing a line sum signal therefrom;
  (b) comparing the line sum signal with a running average line sum signal that is representative of a running average of a given set of previous line sum signals, and producing a resultant signal therefrom; and,
  (c) in the event the resultant signal exceeds a predefined threshold signal value, then signaling that the edge of the medium is sensed.

27. A method for sensing an edge of a medium in an image transfer device, the method comprising:
  (a) radiating a light source upon a surface of a processing path for the medium in the image transfer device;
  (b) detecting an amount of light reflected from the surface of the processing path and summing light impingement values associated with one or more separate zones of photo sensors of a photo sensor array to produce a line sum value that is indicative of an amount of light reflected from the surface of the processing path;
  (c) comparing the amount of light detected with a threshold amount of light to produce a compare result, the threshold amount of light being indicative of a shadow being cast over at least a portion of the processing path in response to the edge of the medium being exposed to the light source in the processing path; and,
  (d) in the event the compare result is not less than the threshold level, then initiating an image transfer of the medium, otherwise, in the event the compare result is less than the threshold level, then repeating steps (a) through (d) until the threshold level is reached.

28. The method of claim 27 further including computing a running average of a given plurality of line sum values for a most recent set of separate scanlines of data retrieved, and wherein a most recent line sum value is differenced with the running average to produce a resultant value, and wherein the resultant value is compared with the threshold amount of light to produce the compare result.

* * * * *